United States Patent [19]
Anderholm et al.

[11] 3,798,569
[45] Mar. 19, 1974

[54] HIGH ENERGY OPTICAL LASER

[75] Inventors: Nordin C. Anderholm; Garth W. Gobeli, both of Albuquerque, N. Mex.

[73] Assignee: The United States of America as represented by the United States Atomic Energy Commission, Washington, D.C.

[22] Filed: Mar. 15, 1973

[21] Appl. No.: 341,450

[52] U.S. Cl............ 331/94.5, 330/4.3, 313/231, 315/111, 333/31, 343/785
[51] Int. Cl............................ H01s 3/09, H01s 3/02
[58] Field of Search................ 331/94.5; 330/4.3; 343/781, 783, 785; 333/21, 31; 313/231; 315/111

[56] References Cited
UNITED STATES PATENTS

| 3,387,227 | 6/1968 | Mastrup et al. | 331/94.5 |
| 3,470,493 | 9/1969 | Altman et al. | 331/94.5 |
| 3,538,455 | 11/1970 | Florio | 331/94.5 |
| 3,571,745 | 3/1971 | Altman et al. | 331/94.5 |
| 3,659,225 | 4/1972 | Furumoto et al. | 331/94.5 X |

*Primary Examiner*—Ronald L. Wibert
*Assistant Examiner*—Robert J. Webster
*Attorney, Agent, or Firm*—Roland A. Anderson; John A. Horan; Dudley W. King

[57] ABSTRACT

A high energy optical laser which utilizes a coaxial pumping scheme having greater diameter than length coupled through a coaxial transmission line and a planar transmission line to a high energy power source to induce a very high energy optical discharge at a wavelength in the pumping band of a lasing material.

4 Claims, 5 Drawing Figures

PATENTED MAR 19 1974 3,798,569

HIGH ENERGY OPTICAL LASER

BACKGROUND OF INVENTION

Optical lasers using various lasing mediums are commonly excited and pumped by flashlamps or excitation means of various configurations and sizes. These flashlamps may be in the form of a helically wound tube with the lasing medium disposed within the helix, one or more elongated straight tubes disposed adjacent to the lasing medium, a coaxial annular chamber disposed about the lasing medium, or the like.

As the use of optical lasers has increased, there have also been increasing demands to produce higher and higher energy laser pulses or beams. Present laser applications often require laser outputs of greater than 100 joules with predicted requirements reaching or exceeding one kilojoule in the foreseeable future. In order to produce such energy laser outputs, flashlamps must be provided which can excite the lasing mediums to a sufficient degree to produce these energies. Various flashlamp configurations have been proposed to attempt to achieve the very high levels of flashlamp light energies needed to achieve such lasing energies but have been limited by various, inherent light absorption losses, deleterious radiation emissions, energy transfer limitations, and the like.

SUMMARY OF INVENTION

It is therefore an object of this invention to provide a high powered, flashlamp pumped optical laser.

It is a further object of this invention to provide an optical laser utilizing a coaxial flashlamp having very low inductance which is capable of high efficiency conversion of electrical energy into radiated energy in lasing medium pumping bands.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

The invention relates to an optical laser which utilizes a tubular flashlamp coaxially encompassing a lasing medium in which the flashlamp includes three parallel electrically conductive plates disposed annularly about the lasing medium perpendicular to the longitudinal axis thereof and spaced apart and dimensioned in a manner to provide an electrical discharge between the bottom and middle plates through a gaseous medium disposed therebetween and coaxial transmission line means for conveying the electrical energy to the middle plate and through the top plate to the bottom plate.

DESCRIPTION OF DRAWING

The invention is illustrated in the accompanying drawing wherein.

DETAILED DESCRIPTION

Figure 1:
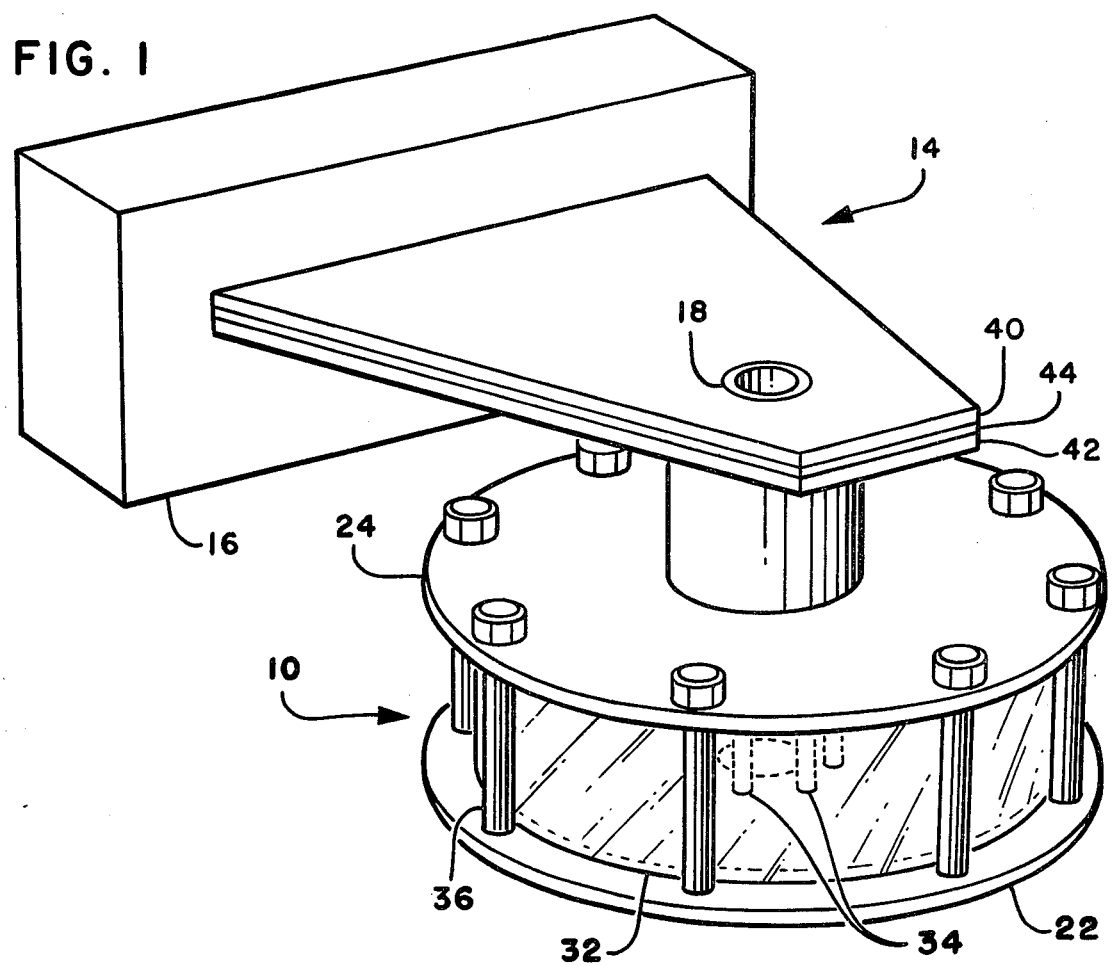
FIG. 1 is a perspective view of an optical laser incorporating features of this invention.
Figure 2:
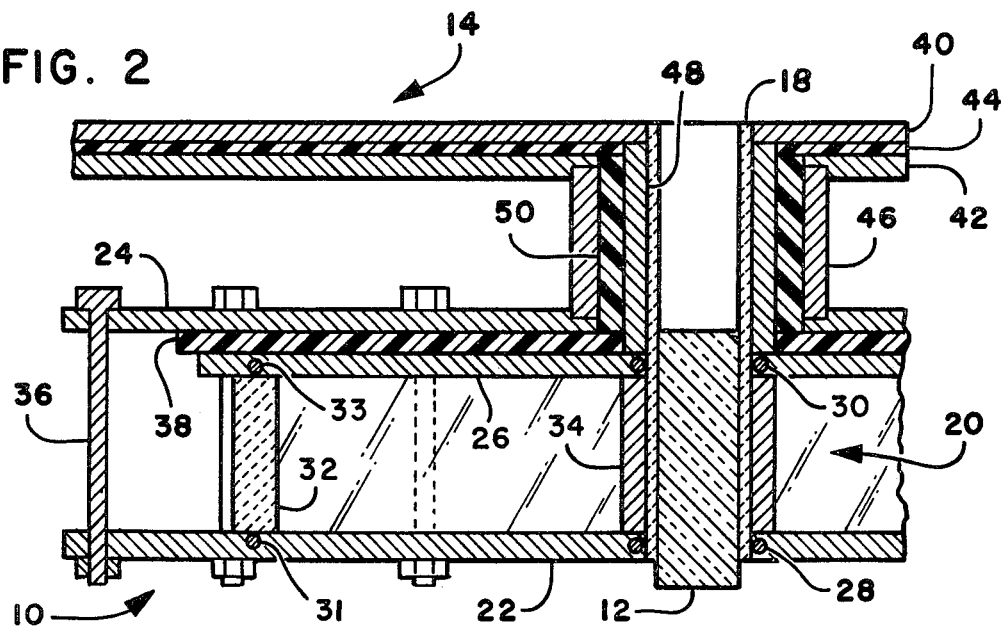
FIG. 2 is a cross sectional view of a segment of the optical laser of FIG. 1 through the center line of the lasing medium.

The optical laser of this invention, as illustrated in FIGS. 1 and 2, includes a tubular flashlamp 10 disposed coaxially about and encompassing, at least partially, a lasing medium 12. The flashlamp 10 is formed in a manner to exhibit extremely low levels of inductance through the transmission line system 14 coupled between the flashlamp 10 and an appropriate power supply 16.

The lasing medium 12, which is shown for purpose of illustration as a rod, may be made of any appropriate lasing material such as solid state materials like ruby, neodymium glass or the like, suitable gases like carbon dioxide, xexon, hydrogen, hydrogen fluoride or the like (particularly at high pressures) and chemical dye laser materials. The lasing medium 12 may have a pumping band at a wavelength of from about 1000 angstroms to about 8000 angstroms and preferably from about 1500 to 5000 A. for most effective utilization of the pumping energy supplied by flashlamp 10. In addition, the lasing medium should preferably require short pumping times at high energies and have high stored energy per unit volume. Particularly appropriate lasing mediums 12 having these properties may include hydrogen fluoride at a pressure of greater than 100 Torr, carbon dioxide at greater than 760 Torr pressure or hydrogen, all of which may be pumped to provide in access of 1 kilojoule of lasing light energy.

The lasing medium 12 may be appropriately mounted and positioned along the longitudinal axis of flashlamp 10 in a position to receive the pumping radiation emitted by flashlamp 10. The lasing medium 12 may be mounted to receive the light directly from flashlamp 10 or it may be positioned within a protective member 18 which is substantially transparent to the pumping radiation and which may provide an inner structural boundary for the flashlamp discharge chamber, as shown. For example, member 18, which is in the form of a hollow tube in the embodiment illustrated, may be formed from such materials as quartz, alumina, or other strong, high temperature and transparent material.

Figure 3:
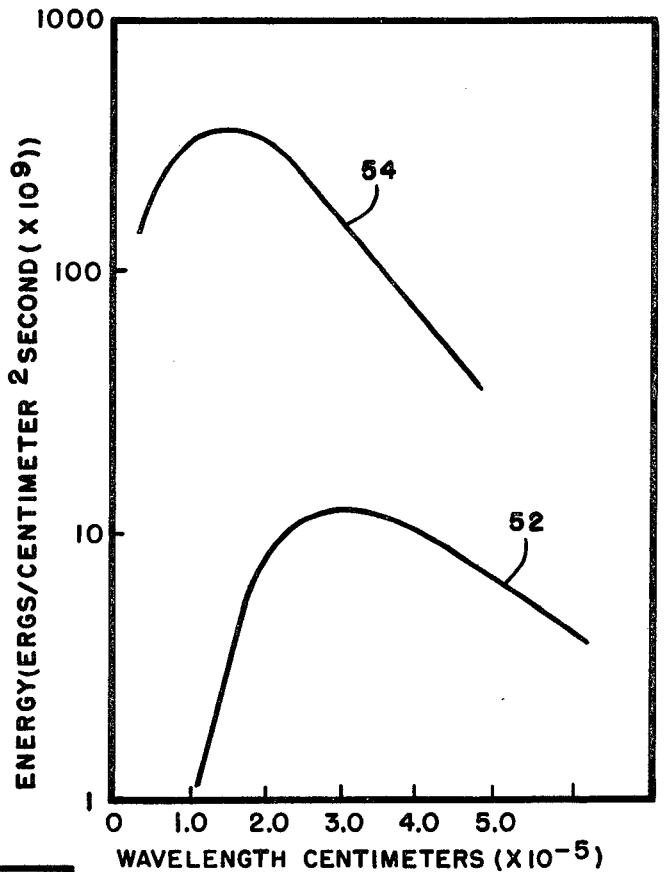
FIG. 3 illustrates typical black body radiation characteristics from gaseous mediums at different temperatures.
Figure 4:
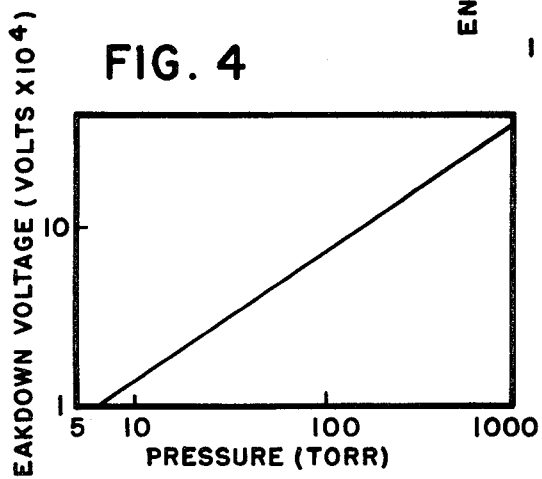
FIG. 4 is a graph showing the relationship of breakdown voltage with respect to a gaseous medium pressure for a typical device of this invention.

The flashlamp 10 includes an annular chamber 20 which contains an ionizable, gaseous medium which, when ionized under appropriate conditions, emits radiation at near peak black body levels in the pumping band of the lasing medium 12 being used. The pumping gases in chamber 20 may include xenon or argon at pressures greater than about 10 Torr or gases such as helium or hydrogen at lower pressures. The radiation frequencies at which the gaseous medium will radiate at black body levels may be adjusted by selecting a desired discharge temperature for the gas at ionization. This temperature in turn may be selected by varying the electrical energy discharged through the gas and/or the mass or number of particles of the pumping gas. The temperature may thus be increased by decreasing gas pressure or by increasing the energy discharged, or combinations thereof. As the temperature is increased, the wavelength at which the ionized gas emits at black body levels may decrease while the energy of the emitted radiation is increased, as shown by the representative curves in FIG. 3. Curve 52 represents the black body radiation which is characteristic of a body at 10,000°K while curve 54 represents the black body radiation which is characteristic of a body at 20,000°K. The curve 52 peaks at ultraviolet light at an energy exceeding $10^{10}$ ergs/cm$^2$ sec (shown in log scale) while curve 54 peaks at far ultraviolet light with an energy greater than $3 \times 10^{11}$ ergs/cm$^2$ sec. For most effective utilization of this invention, gas pressures of from about 100 to 400 Torr are generally preferred. The relationship of breakdown voltage vs gas pressure for typical gases in a discharge chamber of this invention is shown in FIG. 4 in log-log scale. By appropriate operation of the flashlamp, gas temperatures of up to 1,000,000°K or more can be achieved.

Flashlamp 10 is formed by a front or bottom plate 22, an upper or back plate 24, and an intermediate or "floating" plate 26, each supported by appropriate conductive or insulative members in parallel relationship with each other and perpendicular to the longitudinal axis of the lasing medium 12 and the flashlamp 10. Each of the plates is of annular shape having appropriate inner and outer diameters. Plates 22 and 26 have inner diameters which are generally coextensive and in mating engagement with tubular wall 18. Plates 22 and 24 have outer diameters which are comparable and substantially coextensive while the inner diameter of plate 24 is somewhat larger than that of plates 22 and 26 and the outer diameter of plate 26 is less than that of plates 22 and 24. Plates 22 and 26 form two of the boundaries of chamber 20 and are spaced apart a distance determined by the dimensions of lasing medium 12 and the desired operating characteristics of the discharge through chamber 20.

Plates 22 and 26 may be sealed to member 18 by appropriate O-rings or the like sealing members, as shown by seals 28 and 30, to enclose the discharge or pumping gas in chamber 20. Member 18 thus may form an additional wall of chamber 20. The outer wall of chamber 20 is formed by an annular wall 32 disposed generally about the periphery of plate 26 and sealed thereagainst and against plate 22 by appropriate sealing rings 31 and 33 as shown, or the like. Wall 32 should be made of a material which is reflective at the desired pumping band radiation frequencies so as to cause the radiation emitted by the ionized gas to be reflected inwardly toward lasing medium 12. Wall 32 should be electrically insulative and also exhibit good strength characteristics under the operating conditions of flashlamp 10 and may typically be made of such as magnesium fluoride or a ceramic or be a coating disposed on an appropriate supporting wall material.

The inner diameters of plates 22 and 26 may be supported and a conducting path provided for flow of electrical energy therebetween by a plurality of conductive members or rods 34. The rods are dimensioned so as to provide the desired electrical conductivity and support strength without unduly impeding transmission of radiation from chamber 20 to lasing medium 12. While such is shown by way of illustration as a desirous and most advantageous structure to achieve the optimum results, it will be apparent that other electrically conductive and optically transmissive arrangements may be utilized. The outer diameters of plates 22 and 24 may be electrically coupled together and supported by appropriate conductive means such as the plurality of rods or bolts 36 shown disposed about the peripheries thereof or a single annular conductive member.

It has been found that the distance from the inner diameter of plates 22 and 26 to the reflective wall member 32 (the "width" of chamber 20) should be approximately three times the distance between plates 22 and 26 (the "length" of chamber 20) in order to provide the most effective discharge and energy coupling between the energy storage device 16 and the gas enclosed in chamber 20. These relative dimensions and the length of lasing medium 12 generally define the size of chamber 20 and consequently the other members of flashlamp 10. It should be noted that the distance between the outer diameter of plate 26 and the connecting members 36 should be sufficient to withstand the operating voltage of the flashlamp 10 and may vary depending on whether an insulative material is positioned therebetween. The spacing between plates 24 and 26 may be minimized by using an appropriate electrical insulator 38 therebetween to hold off the voltages carried by the plates.

The respective conductive elements of flashlamp 10 should be made of materials which will provide high levels of electrical conductivity and a physical strength sufficient to withstand the very large magnetic forces created by the passage of high levels of electrical current therethrough and from the discharge produced in chamber 20. It has generally been found that brass provides sufficient strength with high electrical conductivities for the functions performed by plates 22, 24 and 26 and members 36 while steel may be preferred for members 34. Insulator 38 may be any appropriate highly insulative material such as polyethylene terephthalate, polytetrafluoroethylene, or the like.

Using the relative dimensions and materials described at the desired gas pressures, it has been found that the flashlamp 10 exhibits an inductance of about 25 nanohenries before the gas discharge or breakdown and an inductance of about 4 nanohenries after breakdown.

The power supply 16 may be any conventional power source which may store sufficient energy to drive the optical laser and which has the capability to transmit this energy to the optical laser in a time period commensurate with the pumping requirements of lasing medium 12. Particularly appropriate power supplies include fast acting, high energy capacitor-type and inductor-type power supplies, such as capacitor banks and explosive generators. The power supply 16 may be provided with an appropriate switch or switching device (not shown) which is capable of switching the stored energy in the desired time period, such as certain dielectric or the like high energy switches. In order to provide the desired pumping band frequencies and energies, the power supply should generally be capable of storing or producing greater than about 50 kilojoules of electrical energy, and as high as 300 or more kilojoules, at voltages of 30 to 70 kilovolts. A capacitor-type power supply, when switched, may produce maximum voltage in shorter time periods whereas an inductor-type power supply normally requires some longer period of time to reach breakdown voltages. For example, a typical capacitor bank may store 300 kilojoules at 60 kilovolts with an overall capacitance rating of 160 microfareds which may be switched in times less than about 1 microsecond. Even though an inductor-type power supply, such as those which explosively decrease the inductance of a coil which is carrying an electrical current, may require several microseconds to reach maximum voltage after beginning at near zero voltage and current, these power supplies do not result in power reflections and instabilities due to the operation of conductive rods 34.

The electrical energy from power supply 16 may be transmitted to flashlamp 10 by an appropriate planar transmission line formed from a planar conductor 40 separated from a parallel planar conductor 42 by an insulator 44. The spacing between the conductors 40 and 42 should be minimized to maintain the inductance of the planar transmission line to as low a level as possible to provide efficient matching and transmittance of electrical energy between the respective devices. The planar transmission line may be coupled to a coaxial transmission line formed from an outer tubular conductive member 46 and an inner tubular conductive member 48 and an intermediate insulative tubular member 50. The diameter of inner tubular conductor 48 is chosen to correspond substantially to the inner diameter of plates 22 and 26 while the outer conductive member 46 has a diameter corresponding with that of the inner diameter of plate 24. The insulative members 44, 50 and 38 may be made as a unitary member of uniform thickness and/or of the same material, if desired, to minimize arcing which may occur between insulators which are joined together by some appropriate means. The conductors of the transmission line may be made of such materials as copper or brass. The various conductors and insulators are shown generally with exaggerated thickness for purpose of illustration and are selected to provide the necessary operating characteristics. The inductance of the planar transmission line may typically be about 5 nanohenries while the inductance of the coaxial transmission line may be about 1 nanohenry.

With the lasing medium appropriately positioned in flashlamp 10 and the chamber suitably filled with the desired pumping gas at a predetermined pressure in a well known manner, the electrical energy stored in power supply 16 may be switched into the transmission line 14. The electron current may flow through the planar transmission line through conductor 40 and the central conductor 48 of the coaxial transmission line into plate 26. As the current flow begins, the initial flow is through rods 34 to plate 22 and via conductive members 36 and plate 24 back to transmission line 14 and the power supply 16. As the current builds up in rods 34, a voltage may be developed between plates 22 and 26 of the gas chamber 20 due to the initial inductance of the current path through rods 34. This voltage resulting from this initial inductance may be about 5 kilovolts while the resistance drop across the steel rods may typically be about 100 volts, thus making effective use of an inductor-type power supply. When voltage between plates 22 and 26 reaches a large enough potential to cause a breakdown in the gas between the plates, the current then begins to flow through the gas at as large a radii as possible since this is the path of least inductance. The current then continues to flow through the gas, heating it, and then via the bottom plate of the gas chamber radially outward to return through the conductors 36 to plate 24 and the transmission line 14.

Figure 5:
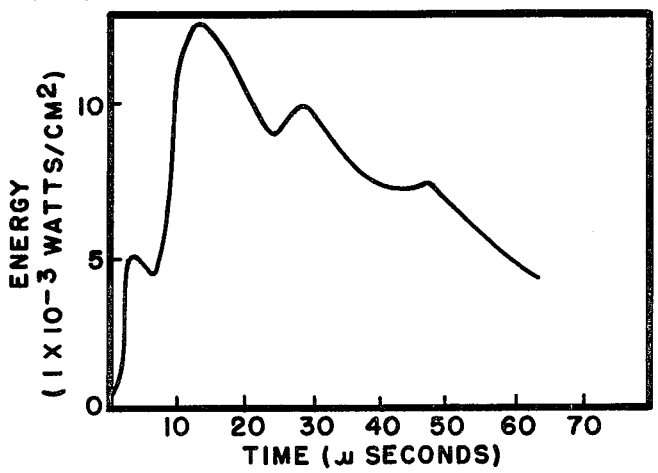
FIG. 5 is a graph showing the time history of radiation in a 500 angstrom band centered at 6250 angstroms of the flashlamp in this optical lasing device for a typical operation.

Using a flashlamp 10 having a plate 22 and plate 26 spaced apart about 3 inches and a chamber 20 having a width of about 9 to 10 inches (an outer diameter of about 24 inches) and using argon at a pressure of about 150 Torr with a capacitor bank voltage of 30 kilovolts discharged therethrough in 20 microseconds, a measured radiation centered at the 5250 angstrom band of about $6.6 \times 10^4$ watts per square centimeter and radiation centered at the 4250 angstrom band of about $5 \times 10^4$ watts per square centimeter was achieved. The flashlamp 10 utilized six steel rods 0.25 inch in diameter as the conductive interconnection at the inner periphery of the discharge chamber. Using the same arrangement with argon at a pressure of 300 Torr and a charging voltage of 35 kilovolts, radiation at the 5250 angstrom band of about $4.6 \times 10^4$ watts per square centimeter and at the 4250 angstrom band of $0.25 \times 10^4$ watts per square centimeter was achieved. The pumping time for each of the operations was about 20 microseconds. The time history of radiation in a 500 A. band centered at 6250 A. for the first operation is shown in FIG. 5. The gas was at a temperature of about 20,000°K. The stored energy in the first operation was about $72 \times 10^3$ joules while in the second operation the stored energy was about $98 \times 10^3$ joules. The total energy radiated in the visible portions of the spectrum in the operations was about $7.8 \times 10^3$ joules and $2.6 \times 10^3$ joules respectively, producing energy conversion efficiencies of about 11 percent and 3 percent.

What is claimed is:

1. In an optical laser comprising the combination a lasing medium having an axis along which laser beam emission takes place a pumping band at a wavelength of from about 1000 A. to about 8000 A.; a tubular gas discharge flashlamp coaxially encompassing said lasing medium, said flashlamp including a first annular electrically conductive plate generally perpendicular to and encircling said lasing medium axis, a second annular electrically conductive plate generally parallel to and spaced from said first plate, an optically reflective tubular wall between outer peripheral portions of said first and second plates and forming therewith an annular chamber, a plurality of spaced apart electrically conductive members interconnecting inner peripheral portions of said first and second plates, a third annular electrically conductive plate generally parallel to and separated by an appropriate electrical insulator from said first plate adjacent a side thereof opposite to said second plate, and means electrically interconnecting outer peripheral portions of said second and third plates; a coaxial transmission line disposed coaxially with respect to said lasing medium and coupled to inner peripheral portions of said first and third plates; a planar transmission line coupled to said coaxial transmission line; and means for supplying greater than about 50 kilojoules of electrical energy through said transmission lines, said third plate and said conducting means to said first and second plates for ionizing a pumping gas in said chamber to a temperature above about 5,000°K for emission of photons predominately at said pumping band.

2. The combination of claim 1 in which the gaseous medium is at a pressure of about 100 to 400 Torr.

3. The combination of claim 1 in which the chamber height to width ratio is about 1 to 3.

4. The combination of claim 1 wherein said electrical energy supplying means is an inductor-type power supply.

* * * * *